United States Patent
DeMont

(10) Patent No.: US 9,316,285 B2
(45) Date of Patent: Apr. 19, 2016

(54) BOLT PLATE FASTENER ASSEMBLY FOR CONVEYOR BELTS

(71) Applicant: Mark Alan DeMont, Oswego, IL (US)

(72) Inventor: Mark Alan DeMont, Oswego, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 13/631,413

(22) Filed: Sep. 28, 2012

(65) Prior Publication Data
US 2013/0084126 A1    Apr. 4, 2013

Related U.S. Application Data

(60) Provisional application No. 61/540,815, filed on Sep. 29, 2011.

(51) Int. Cl.
  *F16B 35/00*   (2006.01)
  *F16G 3/08*    (2006.01)
  *F16B 43/00*   (2006.01)

(52) U.S. Cl.
  CPC . *F16G 3/08* (2013.01); *F16B 43/00* (2013.01); *Y10T 403/5781* (2015.01)

(58) Field of Classification Search
  CPC ............... F16G 3/00; F16G 3/04; F16G 3/08; B65G 15/30; F16B 35/00; F16B 39/26; F16B 43/00
  USPC ................ 403/312, 388, DIG. 15; 198/844.2; 24/31 R–31 V; 411/107, 526, 533, 999
  See application file for complete search history.

(56) References Cited

U.S. PATENT DOCUMENTS

| | | |
|---|---|---|
| 913,024 A | 2/1909 | Meacham |
| 1,854,800 A | 4/1932 | Lowenfeld |
| 1,862,275 A | 6/1932 | Menut |
| 2,200,702 A | 5/1940 | Oddie |

(Continued)

FOREIGN PATENT DOCUMENTS

| | | |
|---|---|---|
| BR | 6600420 | 11/1987 |
| GB | 1040301 A | 8/1966 |

(Continued)

OTHER PUBLICATIONS

Notification of Transmittal of the International Search Report and the Written Opinion of the International Searching Authority, or the Declaration from the International Bureau of WIPO for corresponding International Application No. PCT/US2012/058054, dated Jan. 17, 2013, 11 pages.

*Primary Examiner* — Joshua Kennedy

(74) *Attorney, Agent, or Firm* — Fitch, Even, Tabin & Flannery LLP

(57) ABSTRACT

A belt fastener is provided where, in one form, a washer is assembled on a bolt that extends through a recessed aperture in a lower plate of the belt fastener. An inclined cup wall of the lower plate extends toward the recessed aperture and is for seating of the bolt head thereagainst with the shank extending through the aperture. In accordance with one aspect, the washer is sized to fit into the area of the aperture so that when an upper plate is applied to the belt ends for clamping the belt ends between the upper plate and the lower plate, the washer can be shifted into the aperture area and, if necessary, into the recess formed by the cup. In this manner, the washer is not extruded over the lower cup in contrast to larger washers of prior belt fasteners.

8 Claims, 9 Drawing Sheets

(56) References Cited

U.S. PATENT DOCUMENTS

| | | | |
|---|---|---|---|
| 2,312,379 A | 3/1943 | Bechik | |
| 2,439,516 A | 4/1948 | Holcomb | |
| 2,506,953 A | 5/1950 | Dzus | |
| 2,613,964 A | 10/1952 | Hocher | |
| 3,141,346 A * | 7/1964 | Dean | 198/846 |
| 3,298,270 A | 1/1967 | Launay | |
| 3,367,228 A | 2/1968 | King, Jr. | |
| 3,386,771 A | 6/1968 | Verdier et al. | |
| 3,392,728 A | 7/1968 | Bone et al. | |
| 3,869,219 A | 3/1975 | Wilson et al. | |
| 3,892,031 A | 7/1975 | Bisbing | |
| 3,913,180 A | 10/1975 | Pray | |
| 4,181,447 A | 1/1980 | Roman | |
| 4,235,560 A | 11/1980 | Schimmel | |
| 4,427,318 A | 1/1984 | Kaminski | |
| 4,533,277 A | 8/1985 | Alexander et al. | |
| 4,558,492 A * | 12/1985 | Hite et al. | 24/37 |
| 4,600,343 A | 7/1986 | Frerejacques | |
| 4,659,246 A | 4/1987 | Sugiyama | |
| 4,749,322 A | 6/1988 | Sygnator | |
| 4,757,576 A | 7/1988 | Jaubert | |
| 4,844,677 A | 7/1989 | Schwartzman | |
| 5,161,357 A | 11/1992 | Braunberger et al. | |
| 5,256,020 A | 10/1993 | Ikeda et al. | |
| 5,374,146 A | 12/1994 | Allen | |
| 5,423,647 A | 6/1995 | Suzuki | |
| 5,499,895 A | 3/1996 | Allen | |
| 5,599,131 A * | 2/1997 | Julen et al. | 403/312 |
| 5,896,981 A | 4/1999 | Walsh et al. | |
| 6,053,308 A * | 4/2000 | Vogrig et al. | 198/844.2 |
| 6,077,013 A | 6/2000 | Yamamoto et al. | |
| 6,132,153 A * | 10/2000 | LeVey et al. | 411/290 |
| 6,345,925 B1 * | 2/2002 | Coleman | 403/24 |
| 7,077,263 B1 * | 7/2006 | Richardson et al. | 198/844.2 |
| 2004/0045136 A1 * | 3/2004 | Musil et al. | 24/37 |

FOREIGN PATENT DOCUMENTS

| | | |
|---|---|---|
| GB | 2 066 918 A | 7/1981 |
| GB | 2 226 862 A | 7/1990 |
| WO | WO 0120174 A1 * | 3/2001 |

* cited by examiner

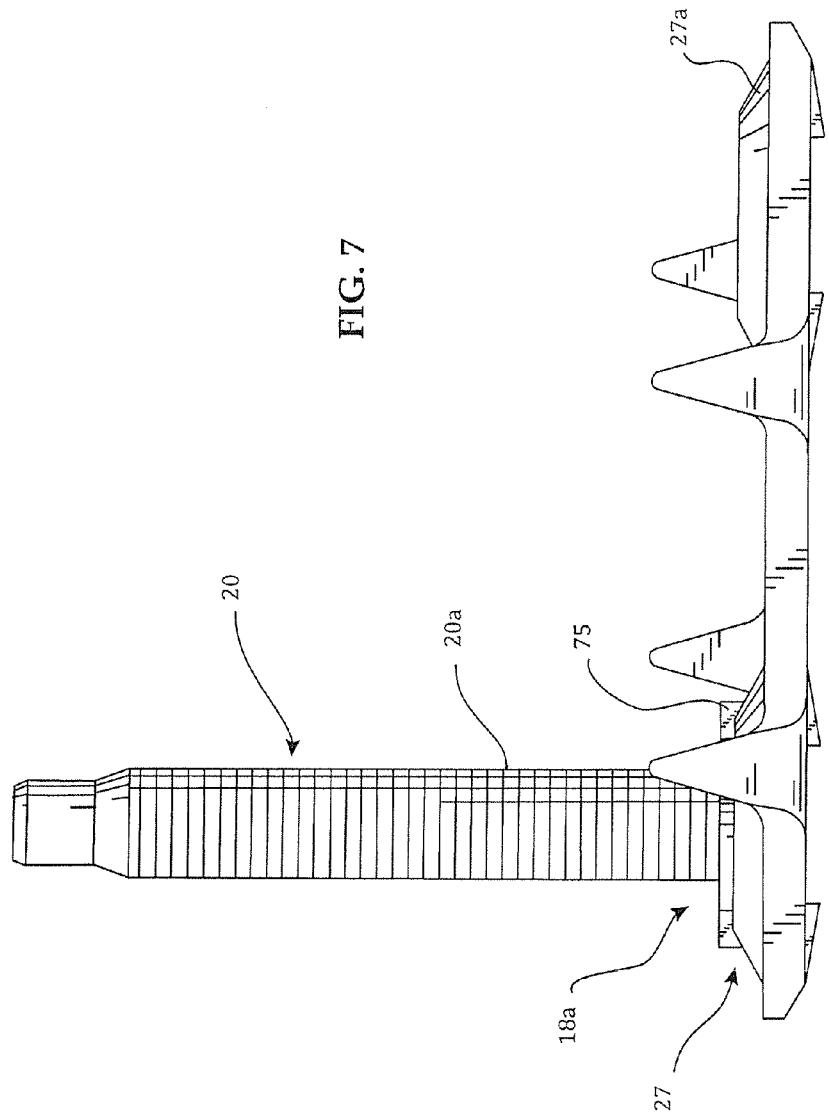

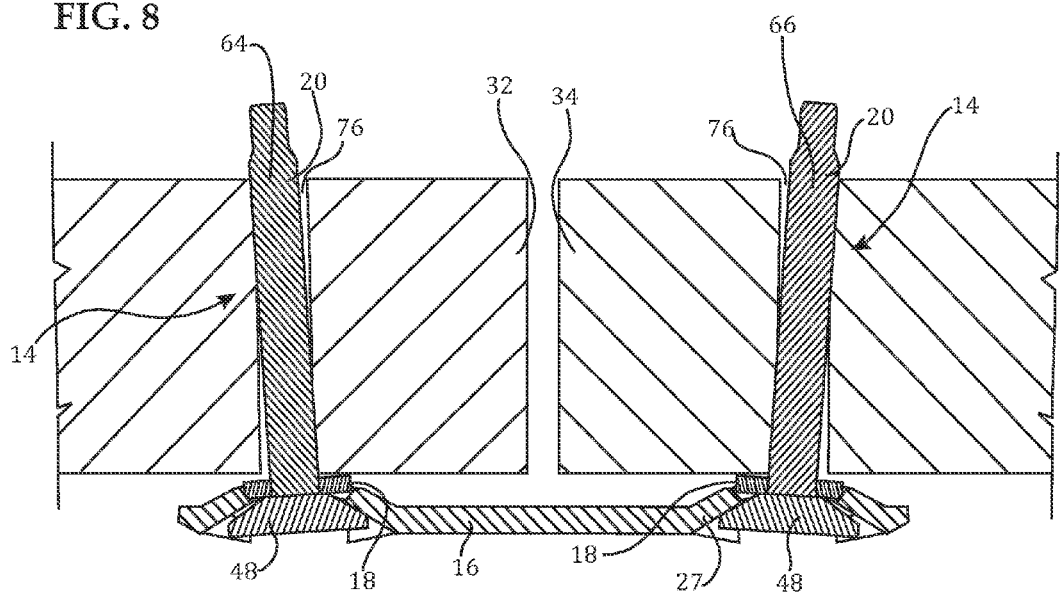
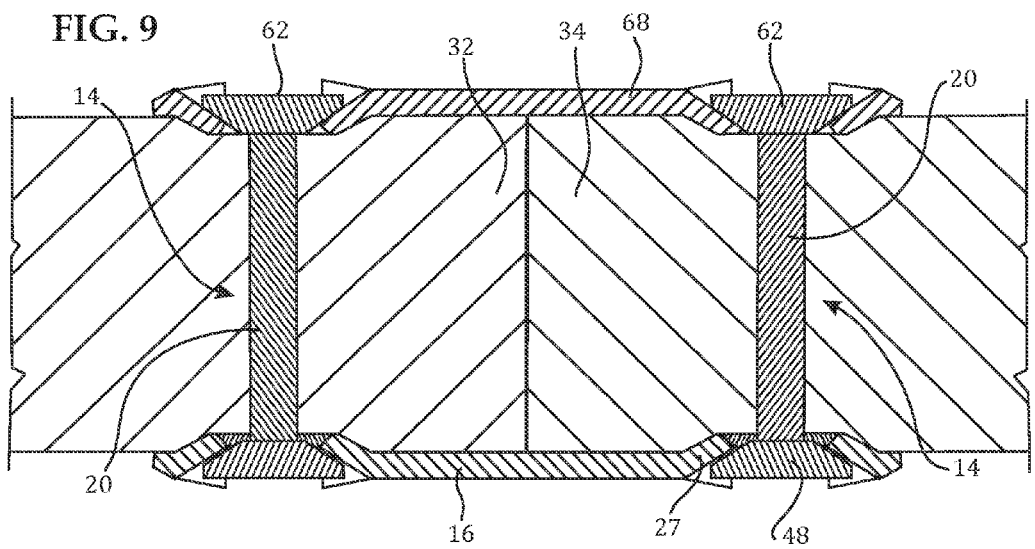

BOLT PLATE FASTENER ASSEMBLY FOR CONVEYOR BELTS

CROSS REFERENCES TO RELATED APPLICATIONS

This application claims benefit to U.S. Provisional Application No. 61/540,815 entitled "Bolt Plate Fastener Assembly for Conveyor Belts" filed Sep. 29, 2011, the contents of which are incorporated herein by reference in its entirety.

FIELD OF THE INVENTION

The invention relates to belt fasteners for connecting ends of a conveyor belt together and, more particularly, to a bolt plate fastener assembly for splicing conveyor belt ends together.

BACKGROUND OF THE INVENTION

Applicant herein provides conveyor belt splicing fasteners called Bolt Solid Plate Fasteners that include upper and lower plates which are sized to span the ends of a conveyor belt to be spliced together. Each of the plates have a pair of recessed apertures for receiving a pair of bolts extending therethrough to fasten the plates together with the belt ends clamped therebetween. These solid plate fasteners are disclosed in U.S. Pat. Nos. 5,599,131 and 6,345,925, both commonly assigned to the Applicant herein and which are incorporated as if reproduced in their entirety herein.

As disclosed in the '131 patent, it is known to provide a preassembled combination of the lower plates and fastening bolts for ease in the application of the fasteners to the belt ends. In this regard, the '131 patent discloses the use of plastic washers for this purpose with the washers being set at a predetermined position above the lower plates along the shank of the bolts to allow the bolt heads and the shanks extending therefrom to swing in the recessed apertures which is important to allow for proper installation of the fasteners to the belt ends.

The recessed apertures are each formed by a cup that is bent from the material of the plates around their apertures. In the lower plate, the cups are bent upwardly so that the apertures are formed at the upper ends of the walls of the cups. The washers are sized to be larger in diameter than the cup apertures, and specifically the uppermost edge of the cup walls that extend about the cup apertures so as to be in interference therewith thereby keeping the bolts and lower plates in assembled relation. Also, the lower cups and bolt heads are provided with cooperating anti-rotation structure in the form of diametrically opposed notches in the cup so that cup wall is formed by a pair of arcuate wall portions. This leaves radially inwardly extending tabs of the lower plate between the arcuate wall portions and below the cup wall notches for being received in corresponding notches formed in the bolt head.

In the '131 patent, the washers are disclosed as being of an extrudable plastic material so that when the bolt plate fastener is installed on the belt ends with the belt ends clamped between the upper and lower plates, the washers will be forced down along the shank of their respective bolts and into engagement with the lower cups to be deformed into the spaces between the bolts and the surfaces of the cup arcuate wall portions as well as around the outer, upwardly facing surfaces of the cup wall portions since the washers each have a larger outer diameter than that of the cup wall uppermost edge extending about the aperture. Thus, there can generally be washer material that remains between the cups of the lower plate and corresponding cups of the upper plate when the fastener plates are clamped together on the belt ends.

Where the belts are relatively thin, e.g. 3/16 inch in thickness between the belt upper and lower surfaces, installers generally like to be able to believe that the cups of the recessed apertures of the upper plates will engage the cups of the lower plates by forcing the pliable belt material out of the way when the plates are clamped onto the belt ends. In this manner, the installed plate fasteners will not unduly increase the profile of the relatively thin belts. However, with the material of the plastic washers engaged against the lower cups, and particularly the outer surface thereof, the washers can present a barrier to the low profile application of the bolt plate fasteners to belt ends of thin conveyor belts.

SUMMARY OF THE INVENTION

A bolt plate fastener assembly is provided where a washer is assembled on a bolt that extends through an aperture in a lower plate of the bolt plate fastener assembly. The aperture is formed via a recessed cup that extends thereabout. The recessed cup is configured to receive the head of the bolt therein. In accordance with one aspect of the invention, the washer is sized to fit into the area of the aperture so that when an upper plate is applied to the belt ends for clamping the belt ends between the upper plate and the lower plate, the washer can be shifted into the aperture area and, if necessary, into the recess formed by the cup. In this manner, the washer is not extruded over the lower cup as are the larger washers of the prior '131 patent.

In one form, the cup wall of each of the recessed apertures has an inclined, annular configuration with the walls being bent upwardly from the generally flat, horizontally extending body of the lower plate and inwardly toward the corresponding recessed aperture. Thus, the inclined walls extend obliquely with respect to the plane in which the generally flat plate body extends. The end or end surface of the inclined cup wall has a reverse incline to that of the cup wall to form a pocket for receiving the washer with the end surface also extending obliquely to the plate body plane. The pocket provides the area around the recessed aperture into which the washer is fit.

More particularly, the inclined cup wall end has an upper, outer arcuate edge and a lower, inner arcuate edge. The washer has an annular body with an outer diameter that is sized to fit into the pocket as by a tolerance or clearance fit therewith. In this regard, the washer body outer diameter can be approximately the same or slightly less than the diametrical distance across the upper, outer edge of the cup wall end surface. On the other hand, the washer body is sized so that it is not able to fit into the recessed area of the cup without being extruded therein such as during application of the bolt plate fastener assembly to a belt end. In this regard, it is preferred that the washer body be in interference with the lower, inner edge of the cup wall end surface. In other words, preferably the washer body outer diameter is slightly larger than the diametrical distance across the lower, inner edge of the cup wall end surface.

With the above-described configuration, the washers can be installed on the threaded shanks of the bolts so as to be received in the pockets at the ends of the cup walls. The washer bodies can have a thickness that is greater than the axial distance between the location along the inclined end surface of the cup wall that is at the same diameter as the outer diameter of the washer body and the upper edge of the cup wall end surface. In this manner, when installed so as to be received in the pockets, the bodies of the washers will have an exposed portion that projects upwardly beyond the upper outer edges of the cup walls in clearance therewith. On the other hand, the sizing of the washers to be in interference with the lower inner edges of the cup wall ends functions to keep the bolts and lower plates in assembled relation. Thus, when a downward force is applied to the washers during installation of the bolt plate fastener assembly, the exposed portion of the washers can be pushed and deformed into the respective pockets, and then the washers can be forced past the cup wall lower edge and into the recessed areas, if necessary, so that no washer material will remain above the cup walls or be extruded onto their generally upwardly facing surfaces.

More specifically, the cup and head of the bolt are provided with cooperating anti-rotation structure. To this end, the annularly configured walls for the cups of the lower plate are each formed by a pair of opposite, arcuate wall portions bent upwardly from the plane of the generally flat plate body of the lower plate so that there are a pair of diametrically opposed notches formed between the arcuate wall portions of each of the cup walls. This leaves a pair of radially inwardly directed tab portions of the plate body that extend radially inward toward each other in the recessed area of the cups. The washers on the bolts are sized to be in interference with the lower, inner, edge of the cup wall end surface, and more particularly the end surface portions of the arcuate wall portions so that the bolts are retained in assembled relation to the lower plate. On the other hand, the washers have a tolerance or clearance fit with the upper, outer edge of the cup wall end surface, and more particularly the end surface portions of the arcuate wall portions, so that the washers can be advanced into the upper end pockets of the respective cups when the bolt plate fastener assembly is installed on the belt ends. In this regard, the washer outer diameter can be approximately the same or slightly smaller than the diameter or diametrical distance across the upper, outer edges of the arcuate wall portions, whereas the washer outer diameter is slightly larger than the diameter or diametrical distance across the lower, inner edges of the arcuate wall portions.

By forming the washers and lower plate cups as described above, extrusion of washer material over the outer or upwardly facing surfaces of the cups is avoided when the upper plate and lower plate are clamped onto conveyor belt ends during installation of the bolt plate fastener assembly. Instead, the clamping force will cause the belt to push the washer down along the shank to be deformed into the annular pockets formed by the end surface portions of the cup arcuate wall portions, and, if necessary, into the recessed areas of the cups.

The ability of the washers to fit into the area of the apertures without being extruded over the outer surfaces of the cups provides advantages in terms of the low profile installation of the bolt plate fastener assemblies herein. This is of particular value with conveyor belts that are relatively thin in thickness, such as on the order of 3/16 inch in thickness. The upper plate is also provided with recessed apertures via cups depending from the body of the upper plate. The upper plate cups receive nuts that are threaded onto the ends of the bolts. With thin belts, the upper and lower plates can be clamped on the belt ends so that the cups of the upper and lower plate push the belt material out of the way to allow the cups to engage one another. In this manner, the bolt plate fastener assembly is at its minimum profile when installed on the belt ends. In this instance, the washer does not present a barrier or layer of washer material that may otherwise prevent the cups of the upper plate from engaging the cups of the lower plate since the washers are not extruded and remain substantially in their original configuration as they are forced into the aperture areas of the lower cups.

In one form, the washers have bodies with an annular configuration. Optionally, the annular washer can include diametrically opposed tabs extending radially outward from the annular body of the washer with the tabs being sized to fit in the notches formed between the arcuate wall portions of the lower plate cups.

BRIEF DESCRIPTIONS OF THE DRAWINGS

FIG. 7 is an elevational view of the lower plate and bolt assembly of FIG. 4 showing the washer partially received in the recessed aperture area formed by the lower plate cup;

FIG. 8 is an enlarged, sectional of the preassembled bolts and lower plate showing the bolts swung outwardly to their insertion position during insertion of the bolts through the belt holes, and a gap between the belt ends;

FIG. 9 is an enlarged, sectional of the preassembled bolts and lower bolt combination showing the bolts swung inwardly to their fastened position substantially parallel to one another and maintained in their fastened position by the upper plate and nuts with the belt ends being moved into tight abutment with one another;

Figure 11:
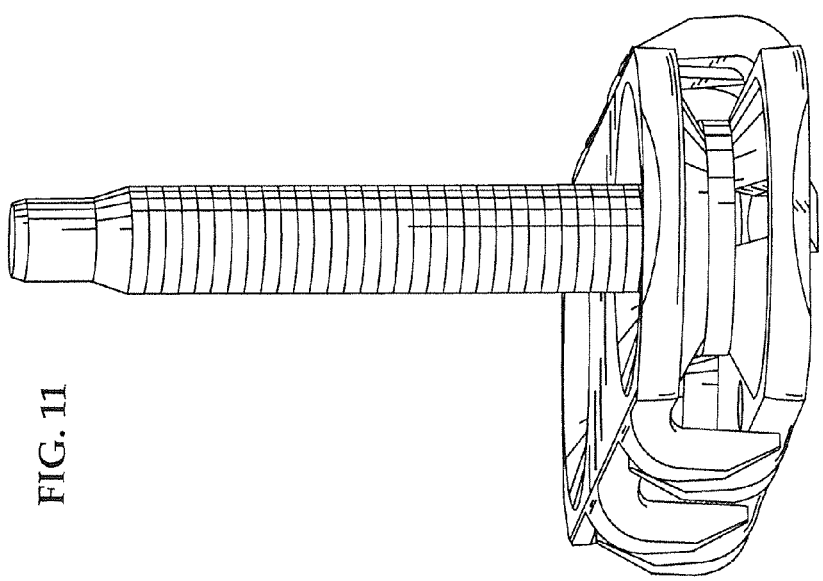
Figure 10:
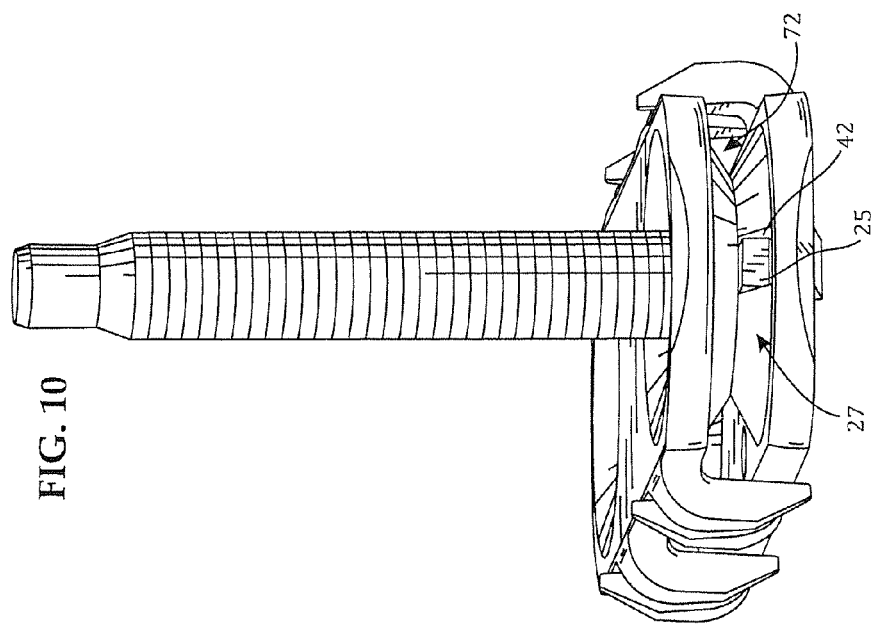

FIG. 10 is a perspective view of the bolt plate assembly generally in its lowest profile configuration with the washer in the recessed aperture area of the lower plate cup and the cups of the upper and lower plates engaged; and FIG. 11 is a perspective view of a prior art bolt plate fastener assembly generally in its lowest profile configuration with a washer between cups of the upper and lower plates.

DETAILED DESCRIPTION OF PREFERRED EMBODIMENTS

Figure 1:
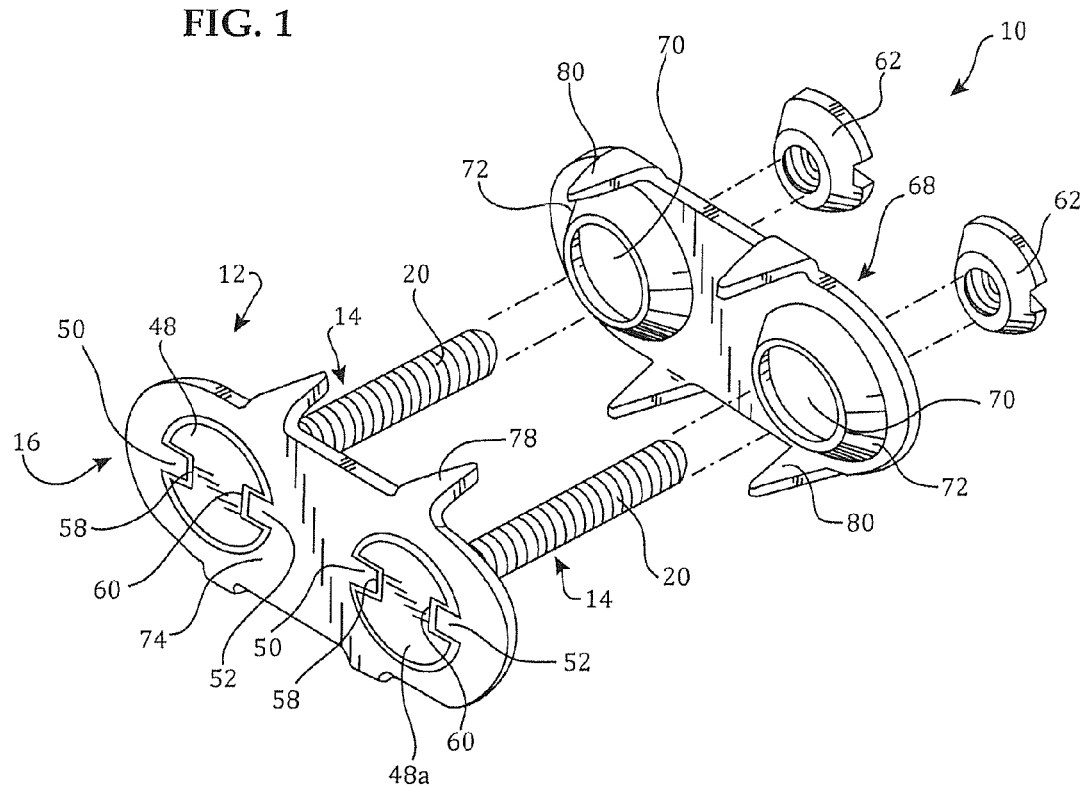
FIG. 1 is a perspective view of a bolt plate fastener assembly in accordance with the present invention showing an assembly of bolts to a lower plate, and an upper plate and nuts for being received on the threaded end portions of the bolts.

In FIG. 1, a bolt plate fastener assembly 10 is shown. As is known, the bolt plate fastener assembly 10 includes an assembly or preassembly 12 of bolts 14 and a lower plate 16. The assembly 12 is maintained in its preassembled condition by washers 18, 18a, one of which is shown in FIGS. 2-7. The washers 18, 18a are received on the shanks 20 of the bolts 14 at a predetermined axial position therealong and are sized so that the bolt shanks 20 will not pass back through recessed apertures 22 of the lower plate 16 through which the shanks 20 have been inserted. As described in the '131 patent, the inner edge portion 23 of each of the washers 18, 18a may have a plurality of flutes or indents 23a so that the inner edge portion 23 can resiliently deflect as the washer 18, 18a is advanced down along the length of the threaded bolt shank 20 past the threads 20a thereof and so that the washers 18, 18a are frictionally retained in a desired axial position along the shank 20 when released.

Figure 5:
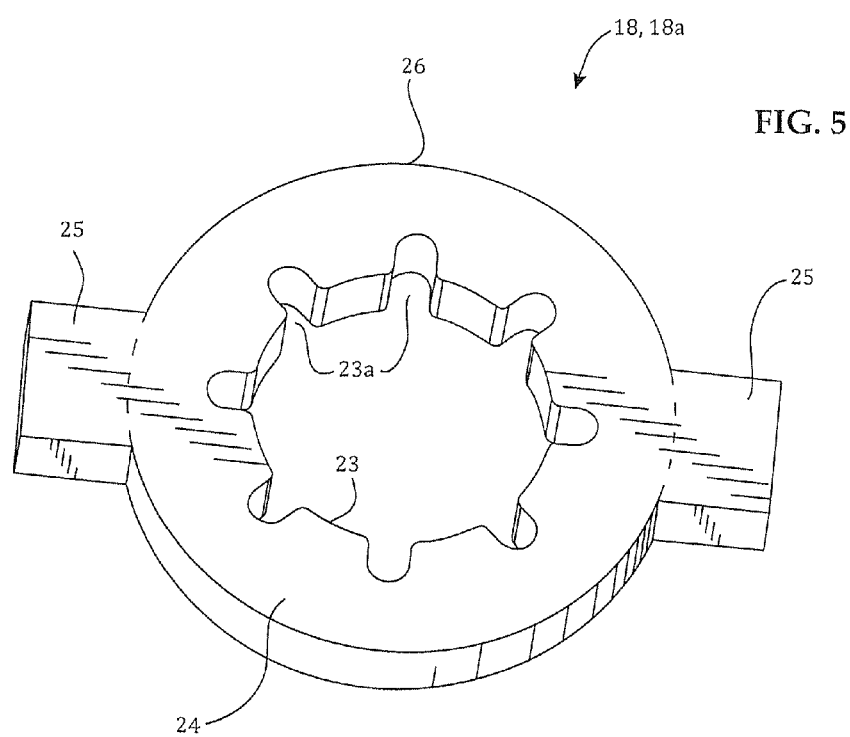
FIG. 5 is a perspective view of the washer showing the tabs as an option.
Figure 6:
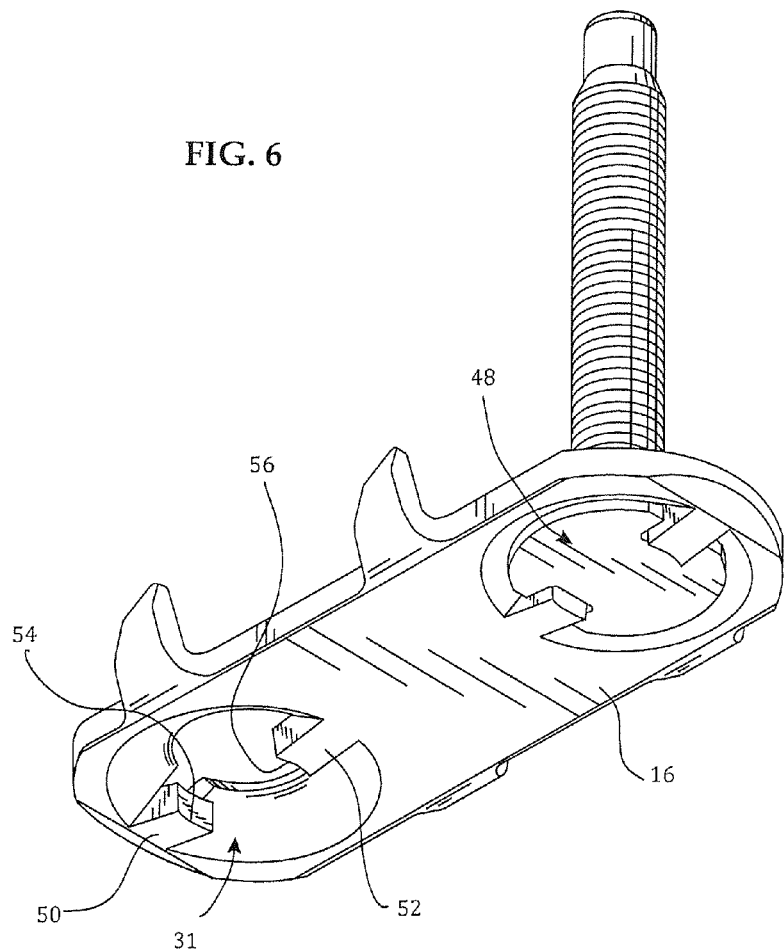
FIG. 6 is a perspective view of the lower plate and bolt assembly with one of the bolts removed to show the recess in one of the cups of the lower plate in which the bolt head is to be received.

Herein, the washer 18, 18a is sized to fit into the area 21 of the recessed apertures 22 without requiring that the material of the washer 18, 18a be extruded into this space as with the washers of the '131 patent. More particularly, the washer 18, 18a can have an annular body 24, as shown in FIG. 5. The material of the washer body 24 can be plastic such as polypropylene. The annular body 24 has an outer diameter across outer circular edge 26 of the washer body 24 that is approximately the same or smaller than the largest diameter of the area 21 of the recessed apertures 22. By way of example and not limitation, the washer outer diameter can be approximately 0.400 in, and the largest diameter of the area 21 of the recessed apertures 22 can be approximately 0.446 in. As an option, washers 18a can also include diametrically opposed tabs 25 that extend radially outwardly from opposite sides of the annular body 24.

Figure 2:
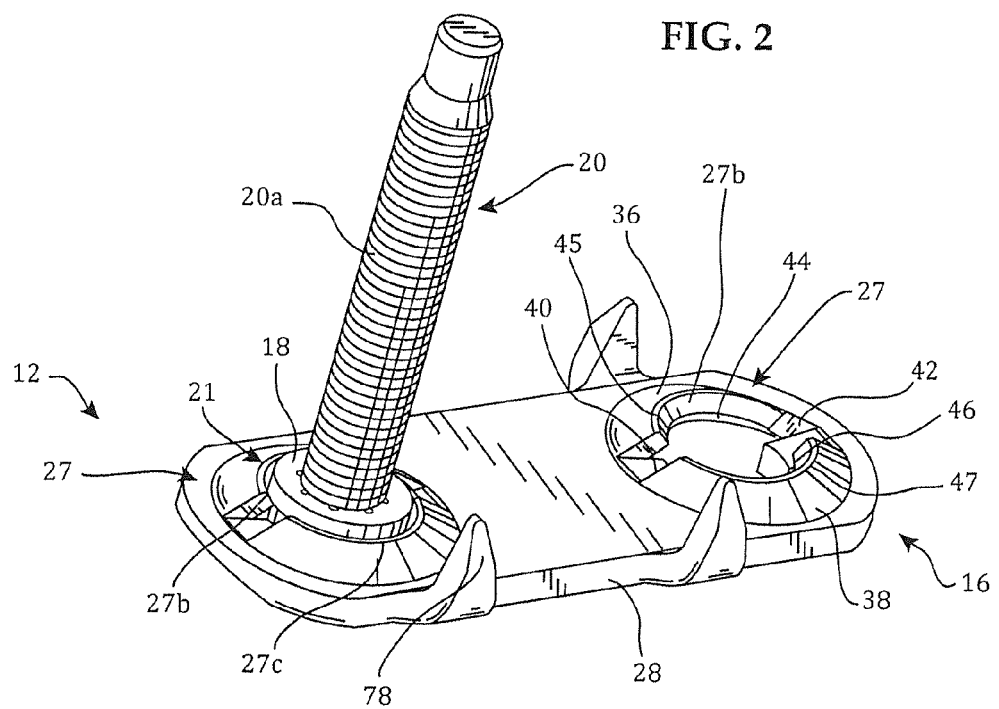
FIG. 2 is a perspective view of the bolts and lower plate assembly with one of the bolts removed to better illustrate one of a pair of recessed apertures of the lower plate and a washer on a shank of the bolt sized for fitting in the area of the recessed aperture about which a cup of the lower plate extends.
Figure 3:
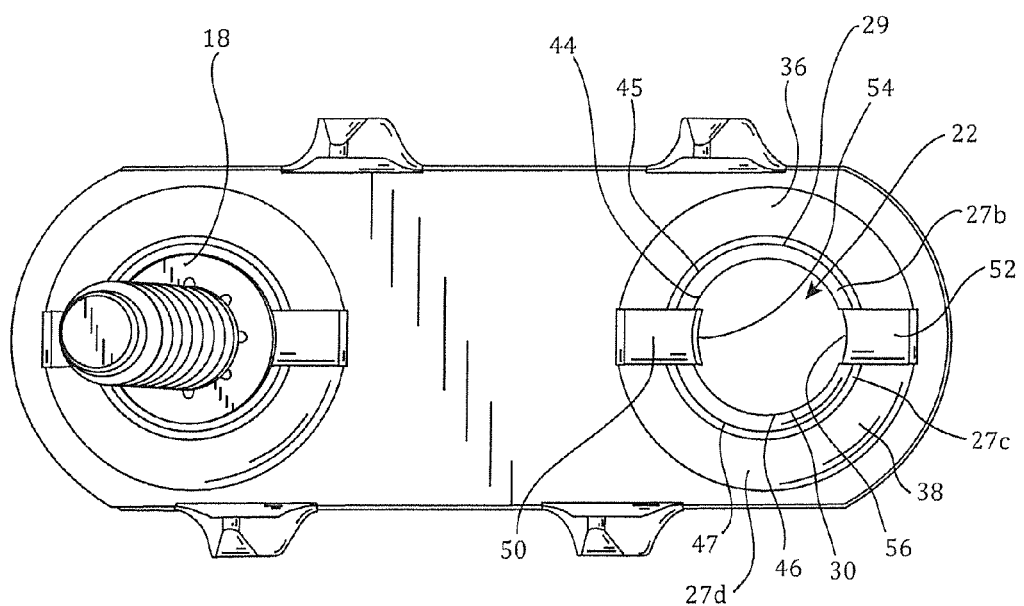
FIG. 3 is a top perspective view of the assembly of FIG. 2 showing anti-rotation tabs projecting radially inward beyond an end surface of the lower plate cup.
Figure 4:
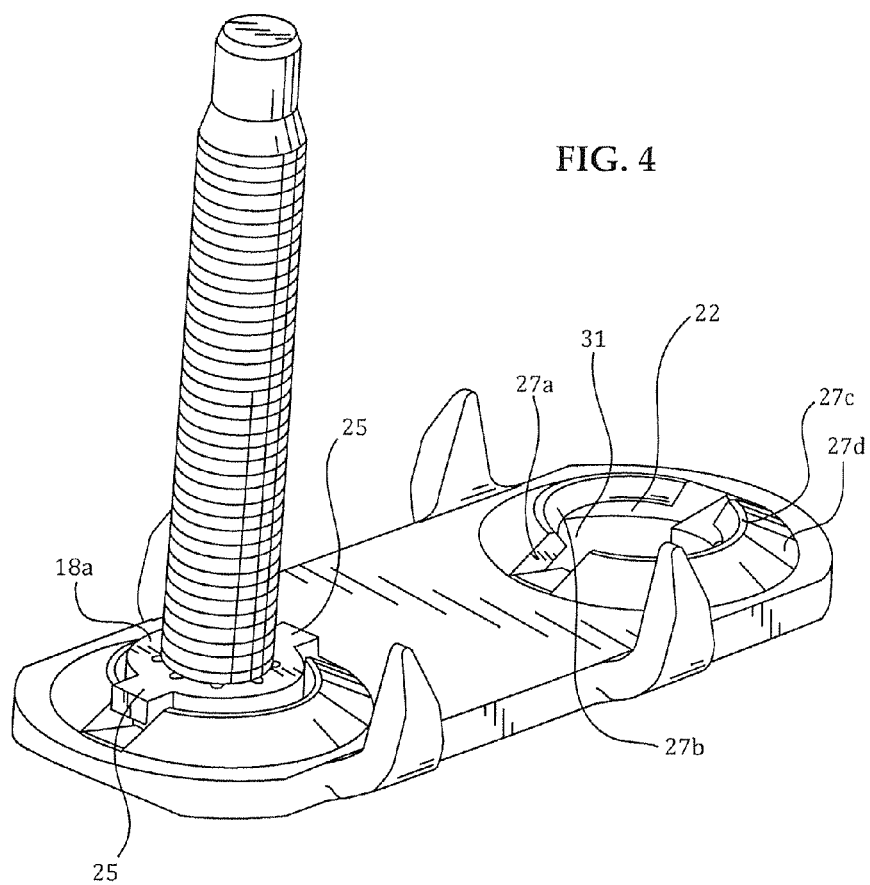
FIG. 4 is a perspective view similar to FIG. 2 with an alternative configuration of the washer to include radially outwardly extending tabs for fitting in anti-rotation notches between arcuate wall portions of the lower plate cup.

Referring to FIGS. 2-4, the recessed apertures 22 are defined by cups 27 that are each bent or deflected upwardly from generally flat, horizontally extending plate body 28 of the lower plate 16 so that generally annular cup wall 27a extends upward and inward at an incline toward the corresponding recessed aperture 22 and obliquely relative to the plane in which the plate body 28 generally extends. The upper ends or end surfaces 27b of the cup walls 27a each have a reverse incline to that of the cup wall 27a so each cup wall end or end surface 27b has an upper, radially outer arcuate edge 29 and a lower, radially inner arcuate edge 30 that extends about the recessed aperture 22. The arcuate inclined end surface 27b tapers radially outwardly as it extends upwardly and obliquely to the plate body plane and forms a generally frustoconical area or pocket 21 for receipt of the washer 18, 18a therein. The diameter across the upper outer edge 29 of each of the apertures 22 corresponds to the largest aperture diameter and is approximately the same or slightly greater than the diameter across the washer outer edge 26 so that the washer 18, 18a can be fit into the area or pocket 21 formed by the inclined end 27b of the cup wall 27a. On the other hand, the diameter across the lower, inner edge 30 of each of the apertures 22 is less than the diameter across the washer outer edge 26 so that the washer 18, 18a is in interference therewith to keep the bolts 14 assembled to the lower plate 16. By way of example, with the washer outer diameter of approximately 0.400 in, the smallest diameter of the recessed apertures 22 across the lower inner edge 30 can be approximately 0.376 in. In this manner, the only time washer material will be received in the recessed area 31 (FIG. 6) provided by the cups 27 for bolt heads 48 is when the bolt plate fastener assembly 10 is installed on belt ends 32 and 34, as shown in FIG. 9, and the washer material is extruded past the lower inner edge 30.

The generally annular, inclined walls 27a of the cups 27 are each preferably formed by a pair of opposite inclined, arcuate wall portions 36 and 38 that generally extend at an incline upwardly and toward each other and are spaced at either side of the recessed aperture 22 by diametrically opposed notches 40 and 42, with the inclined walls 27a generally having the reverse inclination to that of the wall end surfaces 27b, as discussed above. With the inclination of the cup arcuate wall portions 36 and 38, the recess or recessed area 31 generally has a frustoconical configuration to generally match that of the heads 48 of the bolts 14. The smallest diameter of the recessed apertures 22 formed by the lower plate cups 27 is defined across the lower, radially inner edge portions 44 and 46 of the ends or end surface portions of the arcuate wall portions 36 and 38. Taken together, the lower, inner edge portions 44 and 46 form the lower, inner edge 30 which is at the top of the bolt head recess 31 and the bottom of the washer pocket 21 so as to be at the juncture therebetween. Because of the reverse taper of the washer pocket 21 relative to the bolt head recess 31, the largest diameter of the recessed apertures 22 formed by the lower plate cups 27 is defined across the upper, radially outer edge portions 45 and 47 of the ends or end surfaces portions of the arcuate wall portions 36 and 38. Taken together, the upper, outer edge portions 45 and 47 form the upper, outer edge 29 which is at the top of the washer pocket 21. The generally annular body 24 of the washer 18, 18a is sized to fit into the area of the recessed apertures 22 past the outer arcuate edge portions 45 and 47 of the arcuate wall portions 36 and 38 and thus into the pocket 21 of the cups 27 as formed by the arcuate wall portions 36 and 38. The washer 18a is fit onto the bolt shanks 20 so that the tabs 25 thereof are aligned with the notches 40 and 42 for fitting therein when the annular washer body 24 is fit into the pocket 21 of the recessed aperture 22.

The arcuate wall portions 36 and 38 are formed for the provision of anti-rotation structure between the plate body 28 and the heads 48 of the bolts 14. The forming of the notches 40 and 42 in the cups 27 leaves anti-rotation tabs 50 and 52 of the plate body 28 that are aligned with the notches 40 and 42. The tabs 50 and 52 associated with each cup 27 are diametrically opposed and extend radially inwardly toward each other. The anti-rotation tabs 50 and 52 are sized to extend radially beyond the corresponding free ends of the arcuate wall portions 36 and 38 in the recessed area 31 so that respective free end edges 54 and 56 are disposed radially inwardly of the corresponding inner arcuate edge portions 44 and 46.

The anti-rotations tabs 50 and 52 cooperate with the associated bolt head 48 to keep the bolt 14 from rotating during installation of the bolt plate fastener assembly 10 on belt ends 32 and 34. For this, the bolt heads 48 are provided with diametrically opposed notches 58 and 60 into which anti-rotation tabs 50 and 52 are received when the bolts 14 and lower plate 16 are in assembled relation. During fastener installation, nuts 62 are threaded onto threaded end portions 64 and 66 of the threaded shanks 20 to clamp upper plate 68 of the belt fastener 10 onto upper surfaces of the belt ends 32 and 34, as shown in FIG. 9. When the nuts 62 are tightened down on the threaded shanks 20, the belt ends 32 and 34 are clamped between the lower plate 16 and the upper plate 68. The torque applied to the nuts 62 for this purpose is resisted by the anti-rotation tabs 50 and 52 received in the bolt head notches 58 and 60. In this manner, the bolts 14 will not turn as the nuts 62 are threaded onto the threaded shanks 20.

Similar to the lower plate 16, the upper plate 68 has pair of recessed apertures 70 for receipt of the shank end portions 64 and 66 of the bolt shanks 20 therethough. The apertures 70 are recessed in the same manner as the recessed apertures 22 of the lower plate 16 via the formation of annular, inclined cups 72 that are deflected or bent downwardly at an incline from the plane of the generally flat plate body of the upper plate 68. This allows the nuts 62 to be received in the cups 72 so as not to project above the upper surface of the upper plate 68. In the same manner, when the bolt plate fastener 10 is installed on the belt ends 32 and 34, the bolt heads 48 are received in the recessed areas 31 formed by the cups 27, and particularly the arcuate wall portions 36 and 38 thereof, so that the flat surface

48*a* of each of the bolt heads 48 is generally flush with the lower surface 74 of the lower plate 16 and still maintaining anti-rotation engagement between the plate tabs 50 and 52 and the bolt head notches 58 and 60.

For installation, the bolts 14 can be pivoted or swung outwardly as there is play or spacing between the washer 18, 18*a* received on each of the bolt shanks 20 and the anti-rotation tabs 50 and 52. As can be seen best in FIG. 7, the washers 18, 18*a* can be positioned on the bolt shank 20 as to be partially disposed in the washer pocket 21 of the cup 27, but still axially spaced from the plate tabs 50 and 52. This spacing allows the washers 18, 18*a* to rock or pivot in the pockets 21 along the inclined surface 27*b* extending thereabout, and allows the bolts 14 and specifically the heads 48 thereof to rock or pivot in the cups 27 along the inclined cup wall 27*a* while staying assembled to the lower plate 16.

Pivoting of the bolt shanks 20 outwardly away from each other is shown in FIG. 8. The shanks 20 are inserted through holes 76 punched in the belt ends 32 and 34. Thereafter, the bolts 14 are swung inwardly towards each other to their fastened position with the upper plate 68 placed on the belt ends 32 and 34 so that the bolt shank end portions 64 and 66 extend through the corresponding recessed apertures 70 for receiving the nuts 62 thereon, as shown in FIG. 9. In the fastened position, it can be seen that the bolt shanks 20 can extend substantially parallel to each other with the belt ends 32 and 34 brought into tight abutting relation with one another. The lower plate 16 has upwardly bent teeth 78 along its side edges, and the upper plate 68 has downwardly bent teeth 80 from its side edges. When the fastener 10 is applied to the belt ends 32 and 34, these teeth 78 and 80 also bite into the material of the conveyor belt.

The washers 18, 18*a* and the pockets 21 therefor are sized so that with the bolts 14 preassembled to the lower plate 16, the washers 18, 18*a* received in the pockets 21 can bear against the inclined pocket surface 27*b* such that an upper portion 75 of the washer 18, 18*a* will project upwardly beyond the pocket top or upper edge 29 to be exposed from the pocket 21, as can be seen in FIG. 7. The thickness of the washer body 24 can be approximately 0.060 in. The exposed portion 75 can be approximately half the thickness of the washer body 24, or approximately 0.030 in of the washer body thickness can project but from the pocket 21. During installation of the bolt plate fastener 10, the plastic material of the undeformed washer 18, 18*a* can be deformed as it is forced downward to be pushed into and take up space in the pocket between the washer 18, 18*a* and the pocket surface 27*b*, as can be seen in FIGS. 8 and 9. Also, the washer material can be extruded into the notches 40 and 42 and past the lower, inner edge portions 44 and 46 into the bolt head recess 31 during fastener installation, if necessary. However, none of the washer material will be extruded over the cup 27, and specifically on and along the upwardly facing surfaces of the inclined, annular cup wall 27*a* that are outside the recessed aperture area or pocket 21 including top, flat surface 27*c*, and outer, inclined surface 27*d*. Top, flat surface 27*c* extends horizontally between inclined pocket surface 27*b*, and specifically the upper, outer edge 29 thereof, and the top of the outer, inclined surface 27*d*, and is generally parallel to the plate body plane, as shown in FIGS. 2-4.

Where belts are very thin such as on the order of 3/16 inch in thickness, it is desirable for the fastener 10 to be installed so that with the plates 16 and 68 clamped on the belt ends 32 and 34, the respective cups 27 and 72 are in engagement with one another. However, with the larger washers of the prior art bolt plate fastener as shown in the '131 patent and in FIG. 11 herein, the washers generally will create a barrier between the corresponding upper and lower cups so that they do not engage one another. On the other hand, with the washer 18, 18*a* herein, clamping of the plates 16 and 68 on the belt ends 32 and 34 causes the entirety of washers 18 to be driven axially downward by the clamped belt ends 32 and 34 past the upper arcuate edge portions 45 and 47 of the recessed apertures 22 and into the pocket 21 of the upper plate cups 27. As shown in FIG. 10, the washer 18*a* will have its annular body portion 24 pushed into the pocket 21 while the washer tabs 25 can be entirely received in the notches 40 and 42. With the washers 18, 18*a* in the pockets 21 as shown in FIG. 10, the washers 18, 18*a* do not present a barrier between the cups 27 and 72 so that they may engage each other and the plates 16 and 68 can be clamped and installed on the belt ends 32 and 34 in their lowest profile configuration.

Those skilled in the art will recognize that a wide variety of modifications, alterations, and combinations can be made with respect to the above described embodiments without departing from the spirit and scope of the invention, and that such modifications, alterations, and combinations, are to be viewed as being within the scope of the invention.

What is claimed is:

1. A belt fastener for splicing conveyor belt ends together, the belt fastener comprising:
   upper and lower plates for being secured to the belt ends;
   at least one recessed aperture in one of the upper and lower plates;
   a preassembly including the one plate and a bolt having a head and a shank that has threads and that extends through the at least one recessed aperture of the one plate;
   an inclined cup wall of the one plate that extends upwardly and inwardly toward the at least one recessed aperture for seating of the bolt head thereagainst;
   an end surface of the inclined cup wall that has a reverse incline relative thereto wherein the end surface has an upper, radially outer edge and a lower, radially inner edge;
   a pocket of the recessed aperture about which the end surface extends; and
   a washer having an annular body of plastic material including a central opening, a generally circular outer surface portion, and a generally circular inner surface portion extending about the central opening with the circular inner surface portion being free of threading, the washer received on the bolt shank so that the generally circular inner surface portion is in frictional engagement with the shank threads, the washer annular body having upper and lower annular flat faces with the generally circular outer surface portion having a constant outer diameter extending between the upper and lower faces and being sized to have a tolerance or clearance fit relative to the upper radially outer edge of the inclined cup wall end surface to fit into the pocket in a state of the washer body circular outer surface portion and also being sized to be in interference with the lower, radially inner edge of the inclined cup wall end surface so that the washer body engages but does not extend downwardly beyond the cup wall end surface for keeping the one plate and bolt together in the preassembly and so that when the other plate is applied to the belt ends for clamping the belt ends between the upper and lower plates, the washer is not extruded over the inclined cup wall outside the off,
   wherein the washer annular body is prepositioned on the threads of the bolt shank to form the preassembly so that washer body including the outer surface portion thereof in the undeformed state is partially disposed in the pocket, the washer annular body including a lower portion in the pocket having a lower corner juncture between the lower, annular flat face and the circular outer surface portion that extend orthogonally to one another, the corner juncture bearing against the inclined cup wall end surface to form space in the pocket in a radial direction between the washer annular body lower portion and the inclined cup wall end surface allowing the bolt and washer thereon to be pivoted in the pocket for fitting the bolt shank through a hole in one of the belt ends, and the washer body further having an upper portion that projects upwardly out from the pocket with the plastic material allowing the washer body to be deformed as the washer body is forced downward along the shank threads to be pushed further into and take up the space in the pocket between the washer and the cup wall end surface with the upper and lower plates clamping the belt ends therebetween.

2. The belt fastener of claim 1 wherein the inclined cup wall comprises a pair of opposite inclined, arcuate wall portions having diametrically opposed notches therebetween, the end surface comprises end surface portions of the arcuate wall portions, the upper, radially outer edge comprises upper, radially outer edge portions of the end surface portions, and the lower, radially inner edge comprises lower, radially inner edge portions of the end surface portions.

3. The belt fastener of claim 1 wherein the end surface has an arcuate configuration and the upper, radially outer edge has a diameter that is approximately the same or slightly greater than the washer body outer diameter, and the lower, radially inner edge has a diameter that is less than the washer body outer diameter.

4. The belt fastener of claim 1 wherein the end surface has an arcuate configuration, and the pocket has a generally frustoconical configuration.

5. The belt fastener of claim 1 wherein the inclined cup wall has an outer, inclined surface and a top, flat surface extending between the reverse inclined end surface and the outer, inclined surface with the sizing of the washer being such that the washer is not extruded on and along the top, flat surface and the outer, inclined surface when the belt ends are clamped between the upper and lower plates.

6. The belt fastener of claim 1 wherein the one plate comprises the lower plate.

7. The belt fastener of claim 1 wherein the at least one recessed aperture comprises a pair of recessed apertures in the one plate, the inclined cup wall comprises a pair of inclined cup walls corresponding to the pair of recessed apertures, the bolt of the preassembly includes a pair of bolts having heads for being seated against the cup walls and shanks for extending through the recessed apertures, and the washer comprises a pair of washers received on the bolt shanks.

8. The belt fastener of claim 1 wherein the washer annular body upper portion has an upper corner juncture between the upper, annular flat face and the circular outer surface portion that extend orthogonal to one another, the upper corner juncture being in clearance with the upper, radially outer edge of the inclined cup wall end surface so that the washer is not extruded over the inclined cup wall outside the pocket when the belt ends are clamped between the upper and lower plates.

\* \* \* \* \*